United States Patent
Ryu et al.

(10) Patent No.: US 10,152,662 B2
(45) Date of Patent: Dec. 11, 2018

(54) APPARATUS AND METHOD FOR GENERATING 2D BARCODE AND APPARATUS FOR EXTRACTING 2D BARCODE INFORMATION

(71) Applicant: ELECTRONICS AND TELECOMMUNICATIONS RESEARCH INSTITUTE, Daejeon (KR)

(72) Inventors: Seung-Jin Ryu, Daejeon (KR); Min-Sik Kim, Daejeon (KR); Dong-Ho Jeon, Daejeon (KR); Han-Jun Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/593,481

(22) Filed: May 12, 2017

(65) Prior Publication Data

US 2018/0174006 A1 Jun. 21, 2018

(30) Foreign Application Priority Data

Dec. 19, 2016 (KR) .................. 10-2016-0173486

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 7/1447* (2013.01)

(58) Field of Classification Search
USPC .................................. 235/462.01–462.1, 494
See application file for complete search history.

(56) References Cited

U.S. PATENT DOCUMENTS

| 6,201,901 B1 * | 3/2001 | Zhou ........................ G06K 7/14 |
| | | 235/462.09 |
| 8,798,380 B1 * | 8/2014 | Windmueller .... G06F 17/30725 |
| | | 382/232 |

(Continued)

FOREIGN PATENT DOCUMENTS

| JP | 2009-259220 A | 11/2009 |
| KR | 10-0520427 B1 | 10/2005 |

(Continued)

OTHER PUBLICATIONS

QR code-wikipedia, [online] (https://web.archive.org/web/20161216183335/https://en.wikipedia.org/wiki/ QR_code#Error_correction) (Dec. 16, 2016).

*Primary Examiner* — Tuyen K Vo
(74) *Attorney, Agent, or Firm* — LRK Patent Law Firm

(57) ABSTRACT

An apparatus and method for generating a two-dimensional (2D) barcode and an apparatus for extracting 2D barcode information. The apparatus for generating a 2D barcode includes a metadata creation unit for creating metadata corresponding to insertion data and a 2D barcode, a data conversion unit for generating data blocks by converting the insertion data based on the metadata, a pattern generation unit for generating metadata patterns and data block patterns by substituting respective predefined symbols for the metadata and the data blocks, and a 2D barcode generation unit for generating a 2D barcode that contains distortion correction patterns, the metadata patterns, and the data block patterns.

14 Claims, 13 Drawing Sheets

(56) References Cited

U.S. PATENT DOCUMENTS

| | | | |
|---|---|---|---|
| 8,807,434 B1* | 8/2014 | Windmueller | G06K 19/06037 235/462.09 |
| 2007/0138286 A1* | 6/2007 | Kamijoh | G06K 7/14 235/462.04 |
| 2009/0080043 A1* | 3/2009 | Minabe | G11B 7/0065 359/29 |
| 2009/0200379 A1* | 8/2009 | Kuyper-Hammond | G06K 19/06028 235/462.1 |
| 2009/0238626 A1 | 9/2009 | Ming et al. | |
| 2009/0242649 A1* | 10/2009 | Mizukoshi | G06K 19/06037 235/494 |
| 2011/0290878 A1* | 12/2011 | Sun | G06K 7/14 235/437 |
| 2013/0092738 A1* | 4/2013 | Blasinski | G06K 19/0614 235/462.04 |
| 2013/0246721 A1* | 9/2013 | Fukutomi | G06F 3/0604 711/155 |
| 2016/0267370 A1 | 9/2016 | Nishizaki | |

FOREIGN PATENT DOCUMENTS

| | | |
|---|---|---|
| KR | 10-0540879 B1 | 1/2006 |
| KR | 10-2012-0057468 A | 6/2012 |

\* cited by examiner

| ENTIRE LENGTH | DIVISION UNIT | DATA BLOCK ERROR CORRECTION CODE LENGTH | BLOCK SIZE | METADATA ERROR CORRECTION CODE |
|---|---|---|---|---|
| 700 | 200 | 55 | 32 | 0xABCD |

FIG. 3

| idx | DATA (200 BYTES) | ERROR CORRECTION CODE (55 BYTES) |
|---|---|---|
| 2 | 0xFFFF ··· 0xFFFF | 0xFFFF ··· 0xFFFF |

FIG. 4

| INSERTION TARGET INFORMATION | 00 | 01 | 10 | 11 |
|---|---|---|---|---|
| INSERTION SHAPE | | | | |

530

| INSERTION TARGET INFORMATION | 00 | 01 | 10 | 11 |
|---|---|---|---|---|
| INSERTION SHAPE | | | | |

APPARATUS AND METHOD FOR GENERATING 2D BARCODE AND APPARATUS FOR EXTRACTING 2D BARCODE INFORMATION

CROSS REFERENCE TO RELATED APPLICATION

This application claims the benefit of Korean Patent Application No. 10-2016-0173486, filed Dec. 19, 2016, which is hereby incorporated by reference in its entirety into this application.

BACKGROUND OF THE INVENTION

1. Technical Field

The present invention relates generally to technology for generating a two-dimensional (2D) barcode and extracting 2D barcode information and, more particularly, to technology for generating a 2D barcode that is robust to geometric distortion and extracting large-capacity data from the 2D barcode.

2. Description of Related Art

A barcode denotes a code in which black bars and white bars having different thicknesses are combined with each other to code characters or numbers in order for a computer to easily read information. A two-dimensional (2D) barcode denotes a code in which large-capacity data such as characters, numbers or pictures is coded using 2D symbols at high density in a small rectangle, by overcoming limitations in the data capacity of a conventional one-dimensional (1D) barcode. A 1D barcode typically contains about 13 to 14 digits of numerical data. On the other hand, a 2D barcode may contain about 1000 or more alphanumeric characters of data, and may represent Korean, all other foreign languages, and graphical information including fingerprints.

Recently, with the development of information and communication technology, large-capacity data such as that of electronic documents or image files has come to be widely used. Further, with the popularization of user terminals such as smart phones, a user may capture images of desired objects anytime and anywhere. In this environment, the demand for 2D barcode technology that enables digital data to be coded has increased. For example, various types of 2D barcodes, such as a Quick Response (QR) code and a voice code, have been used.

However, conventional 2D barcode technologies are disadvantageous in that it is difficult for a 2D barcode to contain large-capacity data and in that it is vulnerable to geometric distortion. QR code technology, which is representative 2D barcode technology, has come to be widely used in daily life with the popularization of smart phones. In images of objects captured by smart phones, various types of geometric distortion inevitably occur. QR code technology is configured to locate position symbols in an upper-left corner, an upper-right corner, and a lower-right corner of a barcode so as to correct geometric distortion and to correct the geometric distortion using the position symbols.

However, in a QR code, it is recommended that the minimum size of each data symbol be a size of 4×4 pixels or more, and thus the maximum insertion capacity thereof is about 82 bytes per $cm^2$ based on 300 dpi output, and the QR code is typically used in practice to insert Uniform Resource Locator (URL) information.

As another technology, a 2D barcode encoding/decoding system and method disclosed in Korean Patent No. 10-0520427 are configured such that a barcode search pattern in which black/white stripes having regular thicknesses are formed is contained in an isosceles right triangular region and such that, after the barcode search pattern is searched for, encoded data is decoded. Here, this technology represents data at a resolution of 3×3 pixels so as to increase the amount of data that can be inserted. However, since this technology performs a barcode search using the ratio of black and white stripes in the barcode search pattern, it is not robust to geometric distortion such as projection.

In this way, the conventional technologies have limitations when a 2D barcode actually containing large-capacity information is generated and when information is extracted from a 2D barcode in which geometric distortion exists. In connection with this, Korean Patent No. 10-0540879 (Date of Publication: Apr. 10, 2003) discloses a technology related to "Machine Readable Two-Dimensional Barcode and Method of Encoding and Decoding the Same."

SUMMARY OF THE INVENTION

Accordingly, the present invention has been made keeping in mind the above problems occurring in the prior art, and an object of the present invention is to generate a 2D barcode that contains large-capacity data robust to geometric distortion.

Another object of the present invention is to extract large-capacity data, contained in a 2D barcode, from a 2D barcode image captured by an image capture device in which geometric distortion frequently occurs.

A further object of the present invention is to generate a 2D barcode that contains large-capacity data, such as that of as an electronic document or an image file, and to extract large-capacity data from the generated 2D barcode.

Yet another object of the present invention is to produce secure output using a 2D barcode.

In accordance with an aspect of the present invention to accomplish the above objects, there is provided an apparatus for generating a two-dimensional (2D) barcode, including a metadata creation unit for creating metadata corresponding to insertion data and a 2D barcode, a data conversion unit for generating data blocks by converting the insertion data based on the metadata, a pattern generation unit for generating metadata patterns and data block patterns by substituting respective predefined symbols for the metadata and the data blocks, and a 2D barcode generation unit for generating a 2D barcode that contains distortion correction patterns, the metadata patterns, and the data block patterns.

The metadata may include at least one of an entire length of the insertion data, a division unit of the insertion data, an error correction code corresponding to the division unit, an error correction code corresponding to the metadata, and a block size of the 2D barcode.

The data conversion unit may generate the data blocks by dividing the insertion data by the division unit of the insertion data and by inserting an error correction code and an index, which correspond to the division unit, into each piece of insertion data resulting from the division.

The 2D barcode generation unit may generate the 2D barcode by inserting a plurality of distortion correction patterns at intervals of the block size of the 2D barcode in a row direction and a column direction of the 2D barcode.

The 2D barcode generation unit may generate the 2D barcode by inserting the metadata patterns into at least two of an uppermost row, a lowermost row, a leftmost column, and a rightmost column of the 2D barcode.

The metadata patterns may be inserted into spaces between the distortion correction patterns.

The data block patterns may be inserted into regions corresponding to the block size of the 2D barcode, excluding regions of the distortion correction patterns and the metadata patterns.

In accordance with another aspect of the present invention to accomplish the above objects, there is provided an apparatus for extracting two-dimensional (2D) barcode information, including an image acquisition unit for receiving an image including a 2D barcode that contains distortion correction patterns, metadata patterns, and data block patterns, a 2D barcode extraction unit for extracting the 2D barcode from the image, a distortion correction unit for correcting geometric distortion in the metadata patterns and the data block patterns that are contained in the 2D barcode, an information extraction unit for extracting metadata and data blocks from a corrected 2D barcode, and a data reconstruction unit for reconstructing insertion data corresponding to the 2D barcode using the extracted metadata and the extracted data blocks.

The 2D barcode extraction unit may extract the 2D barcode from the image using an outline hierarchy structure corresponding to the image.

The distortion correction unit may extract the distortion correction patterns contained in the 2D barcode and correct geometric distortion in the 2D barcode using the extracted distortion correction patterns.

The distortion correction unit may extract the distortion correction patterns using a method corresponding to at least one of pattern matching and an outline hierarchy structure relationship.

The distortion correction unit may correct a direction of the 2D barcode by calculating correlations between the metadata patterns, which are inserted into at least two of an uppermost row, a lowermost row, a leftmost column, and a rightmost column of the 2D barcode.

The data reconstruction unit may reconstruct the insertion data from the data blocks using a division unit of insertion data included in the metadata.

In accordance with a further aspect of the present invention to accomplish the above objects, there is provided a method for generating a two-dimensional (2D) barcode, the method being performed by a 2D barcode generation apparatus, the method including creating metadata corresponding to insertion data and a 2D barcode, generating data blocks by converting the insertion data based on the metadata, generating metadata patterns and data block patterns by substituting respective predefined symbols for the metadata and the data blocks, and generating a 2D barcode that contains distortion correction patterns, the metadata patterns, and the data block patterns.

The metadata may include at least one of an entire length of the insertion data, a division unit of the insertion data, an error correction code corresponding to the division unit, an error correction code corresponding to the metadata, and a block size of the 2D barcode.

Generating the data blocks may be configured to generate the data blocks by dividing the insertion data by the division unit of the insertion data and by inserting the error correction code and an index, which correspond to the division unit, into each piece of insertion data resulting from the division.

Generating the 2D barcode may include inserting a plurality of distortion correction patterns at intervals of the block size of the 2D barcode in a row direction and a column direction of the 2D barcode, and inserting the metadata patterns into at least two of an uppermost row, a lowermost row, a leftmost column, and a rightmost column of the 2D barcode.

The metadata patterns may be inserted into spaces between the distortion correction patterns, and the data block patterns may be inserted into regions corresponding to the block size of the 2D barcode, excluding regions of the distortion correction patterns and the metadata patterns.

The generated 2D barcode may be extracted by a 2D barcode information extraction apparatus from an image including the 2D barcode, geometric distortion in the 2D barcode may be corrected using the distortion correction patterns, and the 2D barcode may be reconstructed as the insertion data using the metadata and the data blocks that are extracted from the corrected 2D barcode.

A direction of the 2D barcode may be corrected based on correlations between the metadata patterns.

BRIEF DESCRIPTION OF THE DRAWINGS

The above and other objects, features and advantages of the present invention will be more clearly understood from the following detailed description taken in conjunction with the accompanying drawings, in which:

FIG. 3 is an exemplary diagram for explaining metadata according to an embodiment of the present invention;

FIG. 4 is an exemplary diagram for explaining a data block according to an embodiment of the present invention;

FIG. 6 is a diagram illustrating examples of a 2-bit symbol according to an embodiment of the present invention;

DESCRIPTION OF THE PREFERRED EMBODIMENTS

Figure 1:
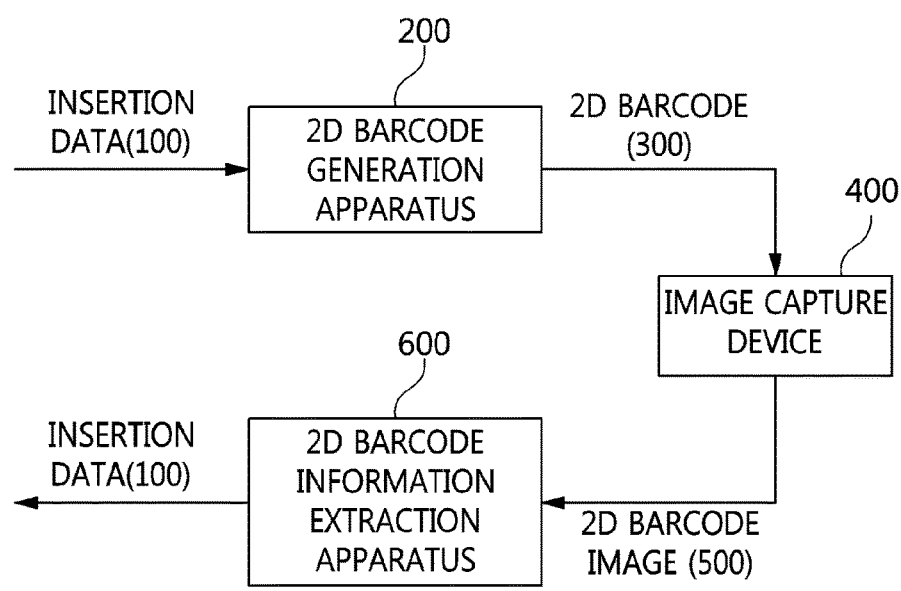
FIG. 1 is a diagram schematically illustrating an environment to which an apparatus for generating a 2D barcode and an apparatus for extracting 2D barcode information according to an embodiment of the present invention are applied.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram schematically illustrating an environment to which an apparatus for generating a 2D barcode (hereinafter also referred to as a "2D barcode generation apparatus") and an apparatus for extracting 2D barcode information (hereinafter also referred to as a "2D barcode information extraction apparatus") according to an embodiment of the present invention are applied.

As shown in FIG. 1, a 2D barcode generation apparatus 200, which receives insertion data (i.e. data that can be inserted into or contained in a 2D barcode) 100, generates a 2D barcode 300 containing the insertion data 100. Further, an image of the generated 2D barcode 300 is captured by an image capture device 400. A 2D barcode information extraction apparatus 600, which receives a captured 2D barcode image 500, extracts the insertion data 100 from the 2D barcode image 500.

Here, the insertion data 100 may be large-capacity data such as that of an electronic document or an image file. Further, the 2D barcode generation apparatus 200 receives the insertion data 100 and generates the 2D barcode 300 corresponding to the insertion data 100.

The size and shape of the 2D barcode 300 may be set to various sizes and various shapes based on both the size of the insertion data 100 and setting information related to the generation of a 2D barcode by the 2D barcode generation apparatus 200.

Further, the image capture device 400 may be an image acquisition device such as a camera, a scanner, a smart phone, or an infrared camera. Although the image capture device 400 and the 2D barcode information extraction apparatus 600 have been described as being implemented as separate devices for the convenience of description, the present invention is not limited thereto. That is, the 2D barcode information extraction apparatus 600 may be provided with an image capture module and may capture an image of the 2D barcode 300 using the provided image capture module.

The 2D barcode image 500 contains the 2D barcode 300, and the 2D barcode information extraction apparatus 600 extracts the 2D barcode 300 from the received 2D barcode image 500 and reconstructs the insertion data 100 contained in the 2D barcode.

Figure 2:
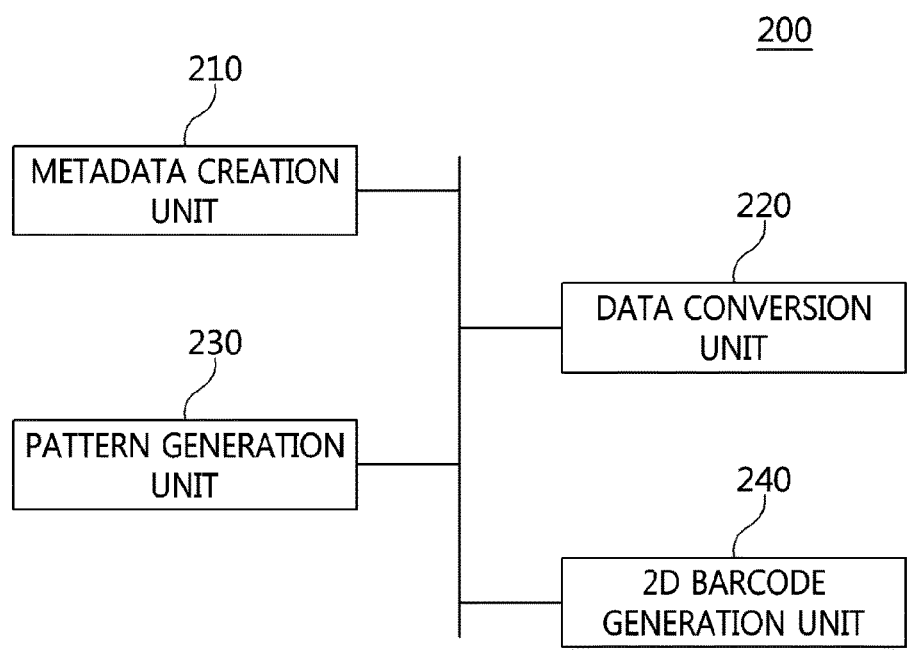
FIG. 2 is a block diagram illustrating the configuration of an apparatus for generating a 2D barcode according to an embodiment of the present invention.

Hereinafter, the configuration of a 2D barcode generation apparatus according to an embodiment of the present invention will be described in greater detail with reference to FIGS. 2 to 9. FIG. 2 is a block diagram illustrating the configuration of a 2D barcode generation apparatus according to an embodiment of the present invention.

As shown in FIG. 2, the 2D barcode generation apparatus 200 may include a metadata creation unit 210, a data conversion unit 220, a pattern generation unit 230, and a 2D barcode generation unit 240.

First, the metadata creation unit 210 creates metadata corresponding to both insertion data and a 2D barcode.

FIG. 3 is an exemplary diagram for explaining metadata according to an embodiment of the present invention.

As shown in FIG. 3, metadata may include at least one of the entire length of insertion data, the division unit of the insertion data, an error correction code corresponding to the division unit, an error correction code corresponding to the metadata, and the block size of a 2D barcode. In particular, the metadata may contain the error correction code corresponding to the metadata, and thus metadata robust to distortion may be created.

Here, the division unit of the insertion data denotes the size of chunks into which the insertion data is divided, and the metadata may further include the length of the error correction code corresponding to the division unit.

Further, the data conversion unit 220 generates data blocks by converting the insertion data based on the metadata.

Here, the data conversion unit 220 may generate the data blocks by dividing the insertion data by the division unit of the insertion data and then inserting both an error correction code and an index corresponding to the division unit into each piece of insertion data resulting from the division.

FIG. 4 is an exemplary diagram for explaining a data block according to an embodiment of the present invention.

As shown in FIG. 4, the data block may be generated in such a way that both an index corresponding to a division unit and an error correction code corresponding to the division unit are added to insertion data that is divided by the division unit.

Next, the pattern generation unit 230 may generate metadata patterns and data block patterns by substituting respective predefined symbols for the metadata and the data blocks.

Figure 5:
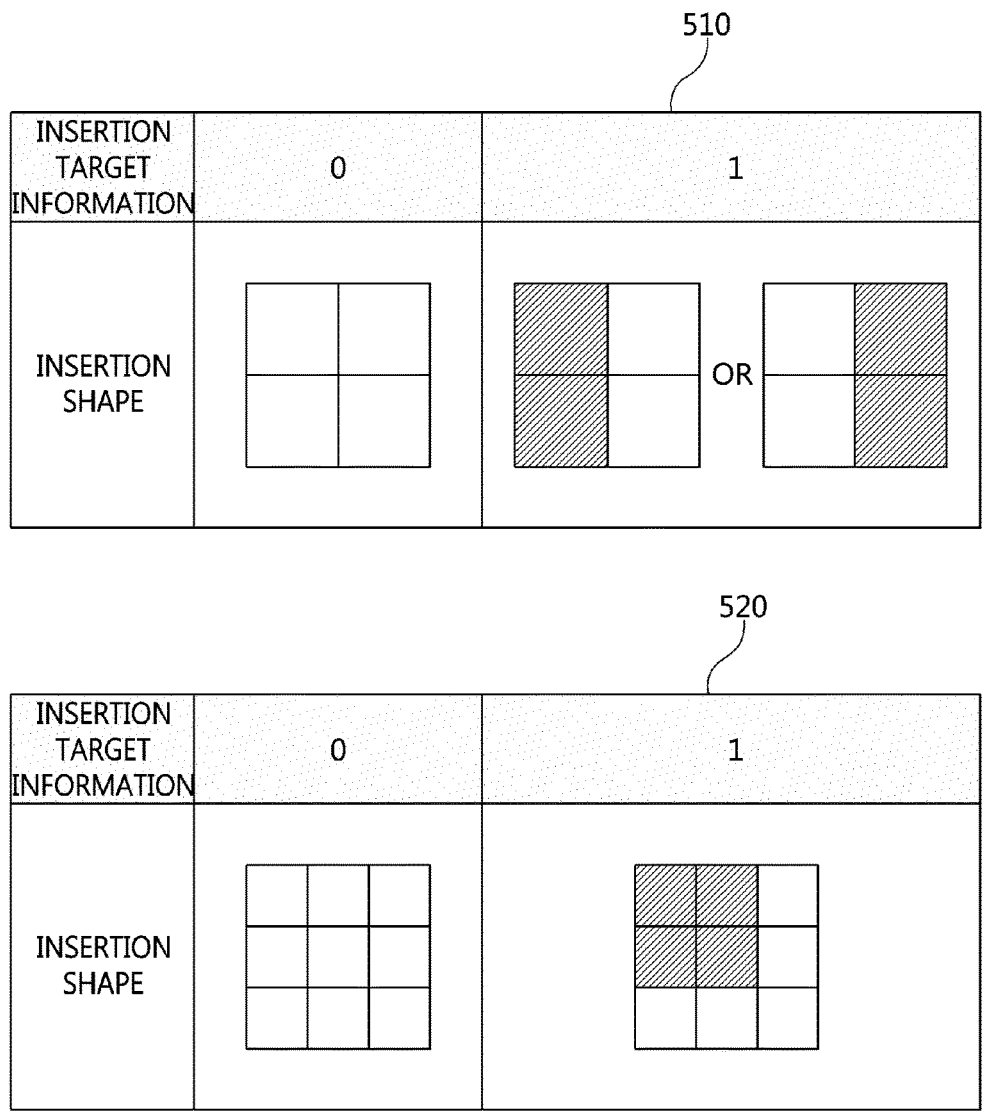
FIG. 5 is a diagram illustrating examples of a 1-bit symbol according to an embodiment of the present invention.

FIG. 5 is a diagram illustrating examples of a 1-bit symbol according to an embodiment of the present invention, and FIG. 6 is a diagram illustrating examples of a 2-bit symbol according to an embodiment of the present invention.

A first symbol 510 and a second symbol 520, which are illustrated in FIG. 5, are examples representing a 1-bit symbol, and a third symbol 530 and a fourth symbol 540, which are illustrated in FIG. 6, are examples representing a 2-bit symbol.

Each symbol may be implemented as sets of symbols having different shapes at the center of regions having a specific size depending on the number of bitstream patterns. That is, symbols may have different shapes in square regions having a specific size based on the number of cases corresponding to a bitstream having a preset length.

In this way, symbols may have different shapes and different sizes, and the pattern generation unit 230 may generate metadata patterns and data block patterns by substituting respective symbols for the metadata and the data blocks.

Although the symbols are exemplified as shown in FIGS. 5 and 6, the configuration of the symbols is not limited to these examples.

Finally, the 2D barcode generation unit 240 generates a 2D barcode containing distortion correction patterns, the metadata patterns, and the data block patterns.

Figure 7:
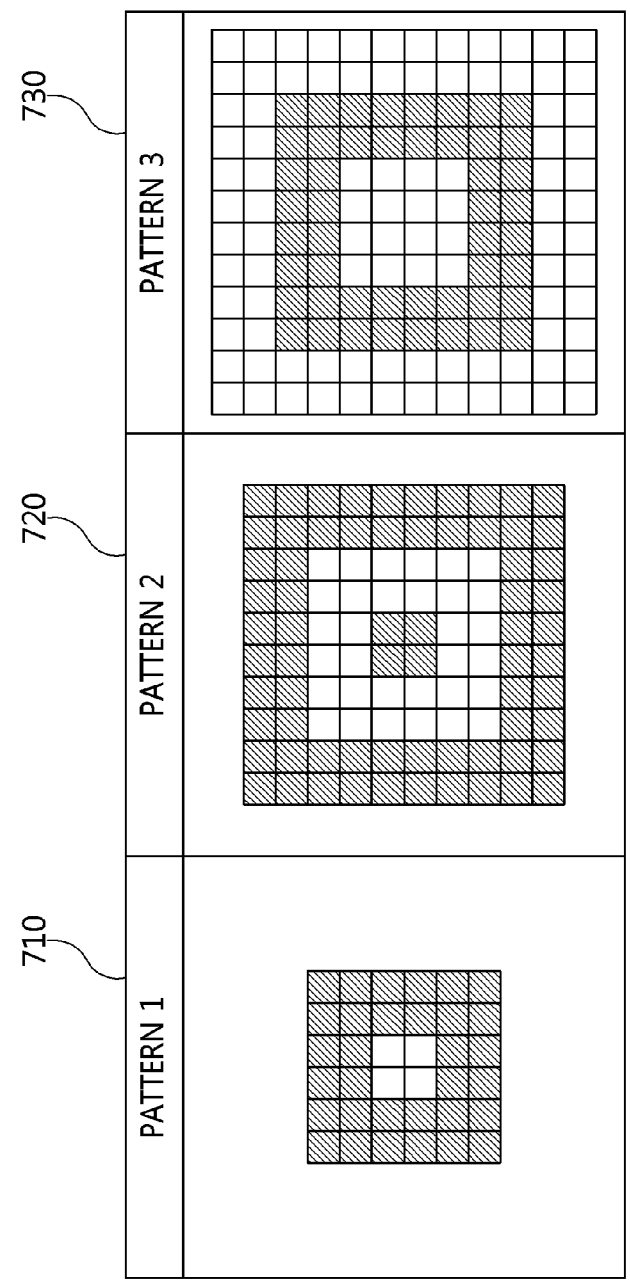
FIG. 7 is a diagram illustrating examples of a distortion correction pattern according to an embodiment of the present invention.

FIG. 7 is a diagram illustrating examples of a distortion correction pattern according to an embodiment of the present invention.

As shown in FIG. 7, the distortion correction pattern may be represented by a first distortion correction pattern 710, a second distortion correction pattern 720, a third distortion correction pattern 730, or the like, and the type of distortion correction pattern is not limited to these examples.

When a 2D barcode is generated, the 2D barcode generation unit 240 may insert a preset number of distortion correction patterns at intervals of the block size of the 2D barcode in the row direction and the column direction of the 2D barcode. Here, the block size of the 2D barcode may be the size corresponding to the metadata of the 2D barcode.

Further, the 2D barcode generation unit 240 may generate a 2D barcode by inserting respective metadata patterns into at least two of the uppermost row, the lowermost row, the leftmost column, and the rightmost column of the 2D barcode. In particular, the 2D barcode generation unit 240 may generate a 2D barcode by inserting a metadata pattern into at least one of the uppermost row and the lowermost row of the 2D barcode and inserting a metadata pattern into at least one of the leftmost column and the rightmost column of the 2D barcode.

Furthermore, the 2D barcode generation unit 240 may generate a 2D barcode by inserting the metadata patterns into spaces between the distortion correction patterns.

In addition, the 2D barcode generation unit 240 may generate a 2D barcode by inserting the data block pattern into the regions corresponding to the block size of the 2D barcode, excluding regions of the distortion correction patterns and the metadata patterns.

Figure 8:
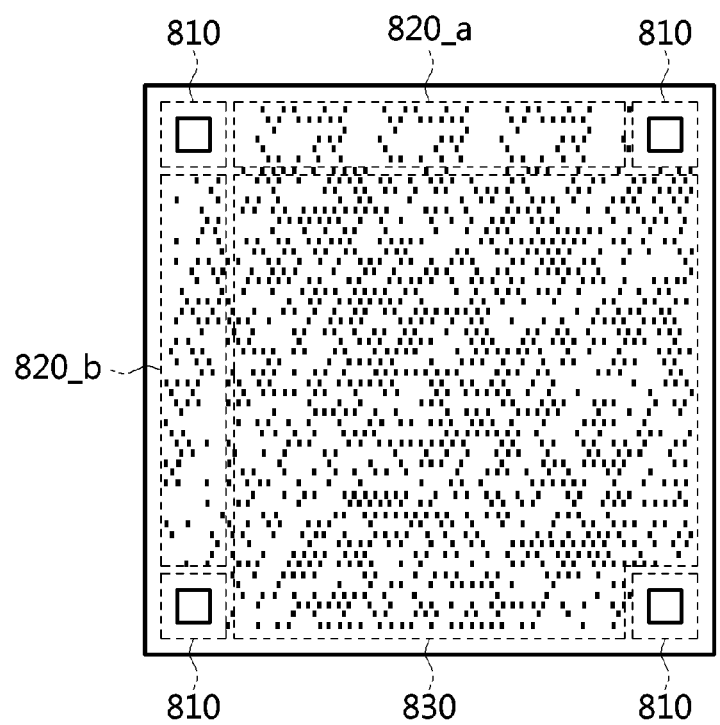
FIG. 8 is a diagram for explaining a 2D barcode according to an embodiment of the present invention.

FIG. 8 is a diagram for explaining a 2D barcode according to an embodiment of the present invention.

As shown in FIG. 8, four distortion correction patterns 810 may be inserted at intervals of the block size of a 2D barcode in the row direction and the column direction of the 2D barcode. Also, metadata patterns 820 may be inserted into spaces between the distortion correction patterns 810. As shown in FIG. 8, metadata patterns 820 (i.e. metadata patterns 820_a and 820_b) may be inserted into the uppermost row and the leftmost column of the 2D barcode. Also, a data block pattern 830 may be inserted into the region corresponding to the 2D barcode, excluding regions of the distortion correction patterns 810 and the metadata patterns 820.

Figure 9:
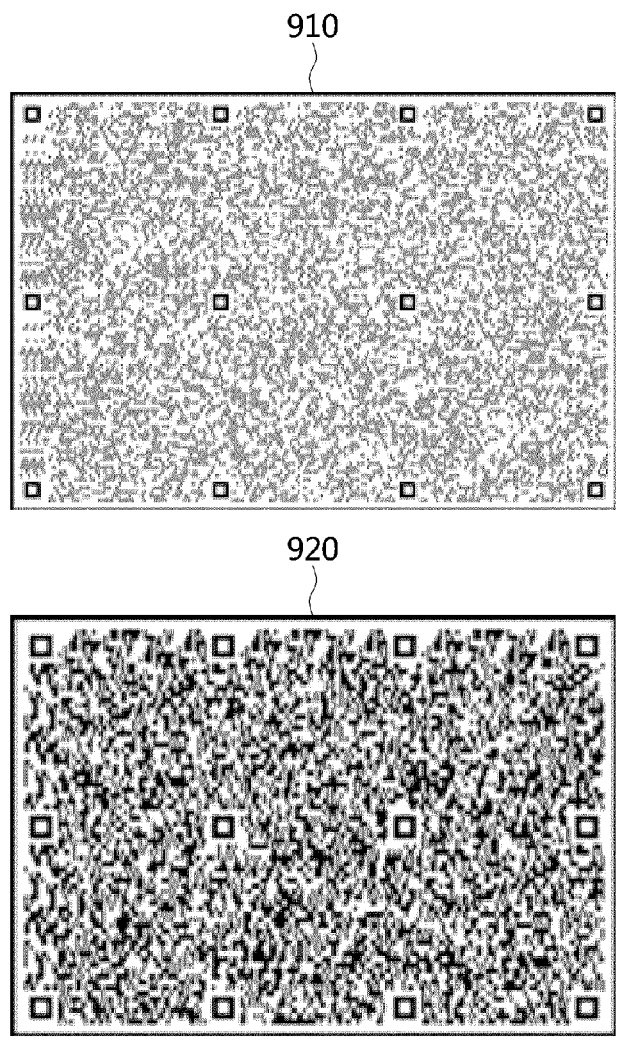
FIG. 9 is a diagram illustrating examples of a 2D barcode according to an embodiment of the present invention.

FIG. 9 is a diagram illustrating examples of a 2D barcode according to an embodiment of the present invention.

2D barcodes 910 and 920 that are finally generated by the 2D barcode generation apparatus 200 may be represented as shown in FIG. 9. For the convenience of description, the 2D barcode generation unit 240 has been described as generating each 2D barcode by inserting metadata patterns into at least two of the uppermost row, the lowermost row, the leftmost column, and the rightmost column of the 2D barcode.

However, the present invention is not limited to this configuration, and the 2D barcode generation unit 240 may generate a 2D barcode by inserting metadata patterns into not only the uppermost row, the lowermost row, the leftmost column, and the rightmost column of the 2D barcode 910 or 920, but also the internal regions of the 2D barcode 910 or 920, as shown in FIG. 9.

Hereinafter, the configuration of an apparatus for extracting 2D barcode information according to an embodiment of the present invention will be described in detail with reference to FIG. 10.

Figure 10:
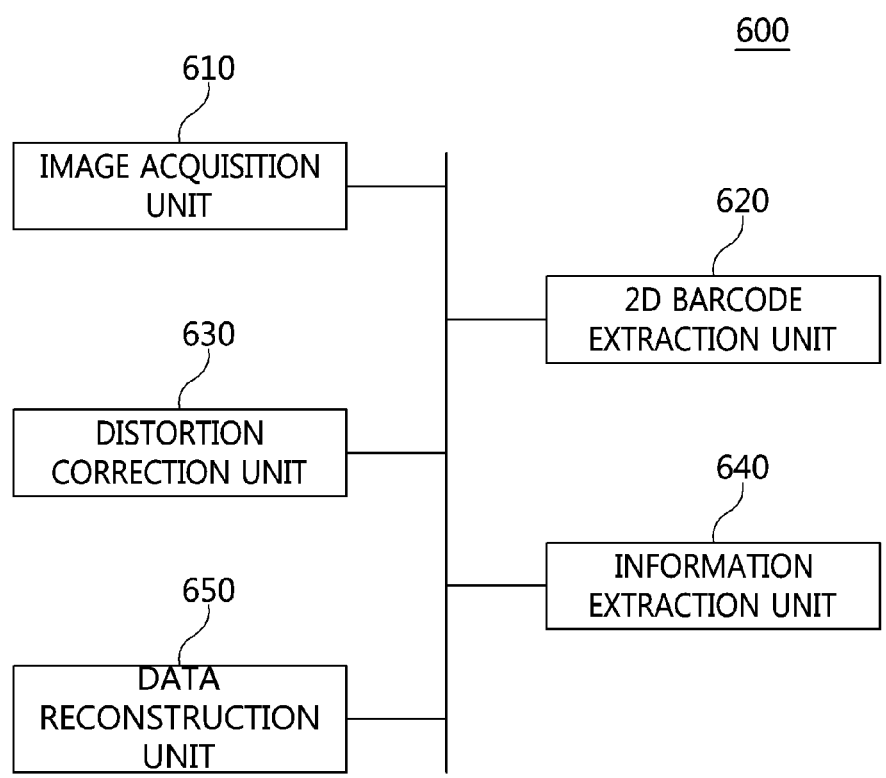
FIG. 10 is a block diagram illustrating the configuration of an apparatus for extracting 2D barcode information according to an embodiment of the present invention.

FIG. 10 is a block diagram illustrating the configuration of an apparatus for extracting 2D barcode information according to an embodiment of the present invention.

As shown in FIG. 10, a 2D barcode information extraction apparatus 600 may include an image acquisition unit 610, a 2D barcode extraction unit 620, a distortion correction unit 630, an information extraction unit 640, and a data reconstruction unit 650.

First, the image acquisition unit 610 receives an image containing a 2D barcode composed of distortion correction patterns, metadata patterns, and data block patterns.

The image acquisition unit 610 may receive the image containing the 2D barcode from an image capture device (or an image acquisition device) such as a camera, a scanner, a smart phone, or an infrared camera.

Although the image acquisition unit 610 has been described as receiving the image containing the 2D barcode for the convenience of description, the present invention is not limited to this operation. That is, the image acquisition unit 610 may directly capture an image of the 2D barcode using an image capture module provided in the 2D barcode information extraction apparatus 600. Here, the image capture module provided in the 2D barcode information extraction apparatus 600 may mean an image-acquisition module corresponding to at least one of a camera, a scanner, a smart phone, and an infrared camera.

The 2D barcode extraction unit 620 extracts a 2D barcode from the image.

Here, the 2D barcode extraction unit 620 may extract a 2D barcode from the image using an outline (contour) hierarchy structure corresponding to the image. The 2D barcode extraction unit 620 may extract the 2D barcode from the image using a method for searching the image represented by the outline hierarchy structure for a layer in which the largest number of points is present.

Next, the distortion correction unit 630 corrects geometric distortion in metadata patterns and data block patterns which are contained in the 2D barcode. Here, the distortion correction unit 630 may include a distortion correction pattern extraction module, a direction correction module, a metadata pattern correction module, and a data pattern correction module.

The distortion correction unit 630 extracts distortion correction patterns contained in the 2D barcode and corrects geometric distortion in the 2D barcode using the extracted distortion correction patterns. Here, the distortion correction unit 630 may extract distortion correction patterns using a method corresponding to at least one of pattern matching and an outline hierarchy structure relationship. Further, the distortion correction unit 630 may correct geometric distortion in the 2D barcode by correcting the extracted 2D barcode to form a square shape.

Also, the distortion correction unit 630 may correct the direction of the 2D barcode by calculating correlations between metadata patterns, which are inserted into at least two of the uppermost row, the lowermost row, the leftmost column, and the rightmost column of the 2D barcode. More specifically, the distortion correction unit 630 may calculate correlation coefficients between the metadata patterns of the 2D barcode and may set a correction direction in which geometric distortion is to be corrected, based on metadata having the highest correlation coefficient.

Furthermore, the distortion correction unit 630 may correct geometric distortion in each of the metadata patterns and in the data block patterns.

Then, the information extraction unit 640 extracts metadata and data blocks from the 2D barcode. The information extraction unit 640 extracts metadata from the 2D barcode in which the geometric distortion is corrected, and extracts data blocks using the extracted metadata (information).

Finally, the data reconstruction unit 650 reconstructs insertion data corresponding to the 2D barcode using both the extracted metadata and the extracted data blocks. Here, the data reconstruction unit 650 may reconstruct the insertion data from the data blocks using the division unit of the insertion data contained in the metadata.

Hereinafter, a 2D barcode generation method performed by the 2D barcode generation apparatus according to an embodiment of the present invention will be described in greater detail with reference to FIG. 11.

Figure 11:
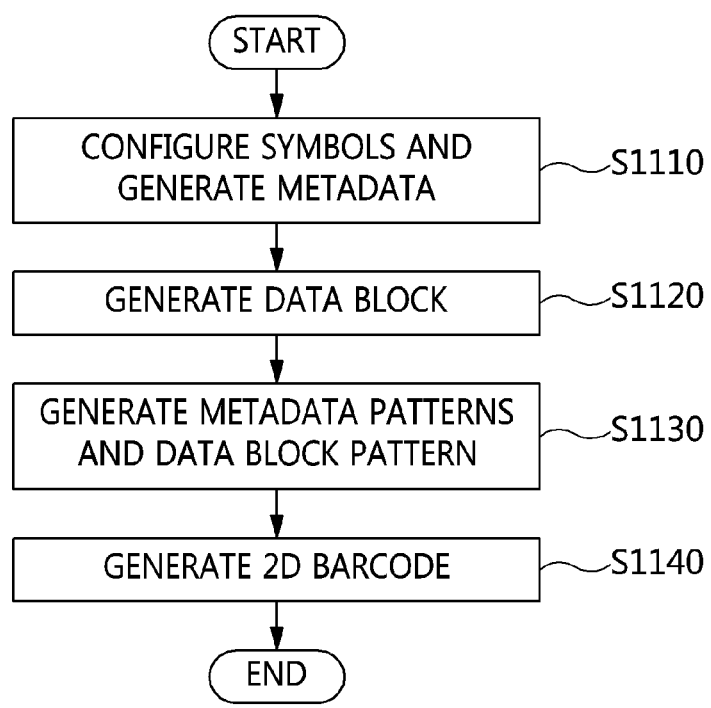
FIG. 11 is a flowchart for explaining a method for generating a 2D barcode according to an embodiment of the present invention.

FIG. 11 is a flowchart for explaining a 2D barcode generation method according to an embodiment of the present invention.

First, the 2D barcode generation apparatus 200 configures symbols and creates metadata at step S1110.

As shown in FIGS. 5 and 6, the 2D barcode generation apparatus 200 may configure sets of symbols having different shapes at the center of a region having a specific size depending on the number of bitstream patterns. In this case, the 2D barcode generation apparatus 200 may configure symbols so that the symbols have different shapes in square regions having a specific size based on the number of cases corresponding to a bitstream having a preset length.

Further, the metadata means data corresponding to insertion data and a 2D barcode. The metadata may include at least one of the entire length of the insertion data, the division unit of the insertion data, an error correction code corresponding to the division unit, an error correction code corresponding to the metadata, and the block size of the 2D barcode.

That is, the 2D barcode generation apparatus 200 may store the entire size of the insertion data, may store the size of chunks (division unit) into which the insertion data is divided, and may also store the size of the error correction code to be added to the division unit. Further, the 2D barcode generation apparatus 200 may create metadata by adding an error correction code for metadata to the metadata.

Next, the 2D barcode generation apparatus 200 generates data blocks by converting the insertion data based on the metadata at step S1120.

The 2D barcode generation apparatus 200 may generate the data blocks by dividing the insertion data by the division unit (into chunks) defined in the metadata and inserting an error correction code and an index, which correspond to the division unit, into each piece of insertion data resulting from the division.

Next, the 2D barcode generation apparatus 200 generates metadata patterns and data block patterns at step S1130.

The 2D barcode generation apparatus 200 generates the metadata patterns and the data block patterns by substituting respective symbols for the metadata and the data blocks. Here, the symbols may be predefined, and the 2D barcode generation apparatus 200 may further perform the step of defining symbols before creating the metadata at step S1110.

Finally, the 2D barcode generation apparatus 200 generates a 2D barcode that contains distortion correction patterns, metadata patterns, and data block patterns at step S1140.

The 2D barcode generation apparatus 200 may insert a plurality of distortion correction patterns at intervals of the block size of the 2D barcode in the row direction and column direction of the 2D barcode.

Further, the 2D barcode generation apparatus 200 may insert metadata patterns into at least two of the uppermost row, the lowermost row, the leftmost column, and the rightmost column of the 2D barcode. Here, the 2D barcode generation apparatus 200 may insert the metadata patterns into spaces between two distortion correction patterns.

In particular, the 2D barcode generation apparatus 200 may insert a metadata pattern into the space between distortion correction patterns in the uppermost row or lowermost row of the 2D barcode and may insert a metadata pattern into the space between distortion correction patterns in the leftmost column or rightmost column of the 2D barcode.

Further, the 2D barcode generation apparatus 200 may generate the 2D barcode by inserting the data block patterns into regions corresponding to the block size of the 2D barcode, excluding regions of the distortion correction patterns and the metadata patterns.

Although, for the convenience of description, the 2D barcode generation apparatus 200 has been described as generating the 2D barcode by inserting the distortion correction patterns, the metadata patterns, and the data block patterns into respective regions, the present invention is not limited to this configuration. That is, it is possible to generate a single 2D barcode by dividing the 2D barcode into a plurality of partial regions, inserting at least one of the distortion correction patterns, the metadata patterns, and the data block patterns into each of the partial regions, and combining the partial regions into which the patterns are inserted.

Hereinafter, a 2D barcode information extraction method performed by the 2D barcode information extraction apparatus according to an embodiment of the present invention will be described in greater detail with reference to FIG. 12.

Figure 12:
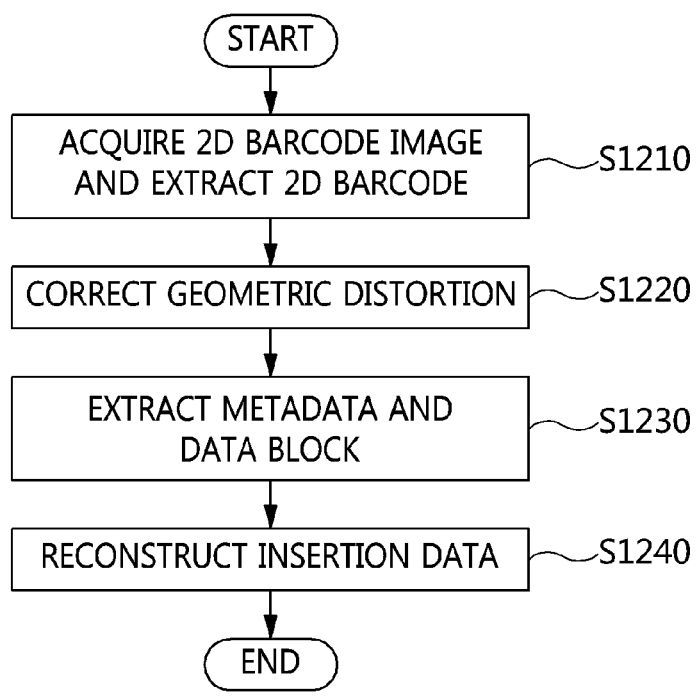
FIG. 12 is a flowchart for explaining a method for extracting 2D barcode information according to an embodiment of the present invention.

FIG. 12 is a flowchart for explaining a 2D barcode information extraction method according to an embodiment of the present invention.

First, the 2D barcode information extraction apparatus 600 acquires a 2D barcode image and extracts a 2D barcode from the acquired 2D barcode image at step S1210.

The 2D barcode information extraction apparatus 600 receives an image that contains a 2D barcode composed of distortion correction patterns, metadata patterns, and data block patterns. Further, a 2D barcode is extracted from the received image. Here, the 2D barcode information extraction apparatus 600 may extract the 2D barcode from the image based on an outline hierarchy structure corresponding to the image.

Then, the 2D barcode information extraction apparatus 600 corrects geometric distortion in the metadata patterns and the data block patterns contained in the 2D barcode at step S1220.

The 2D barcode information extraction apparatus 600 extracts distortion correction patterns contained in the 2D barcode and searches for the direction in which the geometric distortion in the 2D barcode is to be corrected using the extracted distortion correction patterns. Further, the 2D barcode information extraction apparatus 600 corrects geometric distortion in each of the metadata patterns and the data block patterns.

Here, the 2D barcode information extraction apparatus 600 may extract the distortion correction patterns using a method corresponding to at least one of pattern matching and an outline hierarchy structure relationship. Further, the 2D barcode information extraction apparatus 600 may correct the 2D barcode to form a square shape using the extracted distortion correction patterns.

Furthermore, the 2D barcode information extraction apparatus 600 may correct the direction of the 2D barcode by calculating correlations between metadata patterns which are inserted into at least two of the uppermost row, the lowermost row, the leftmost column and the rightmost column of the 2D barcode.

Figure 13:
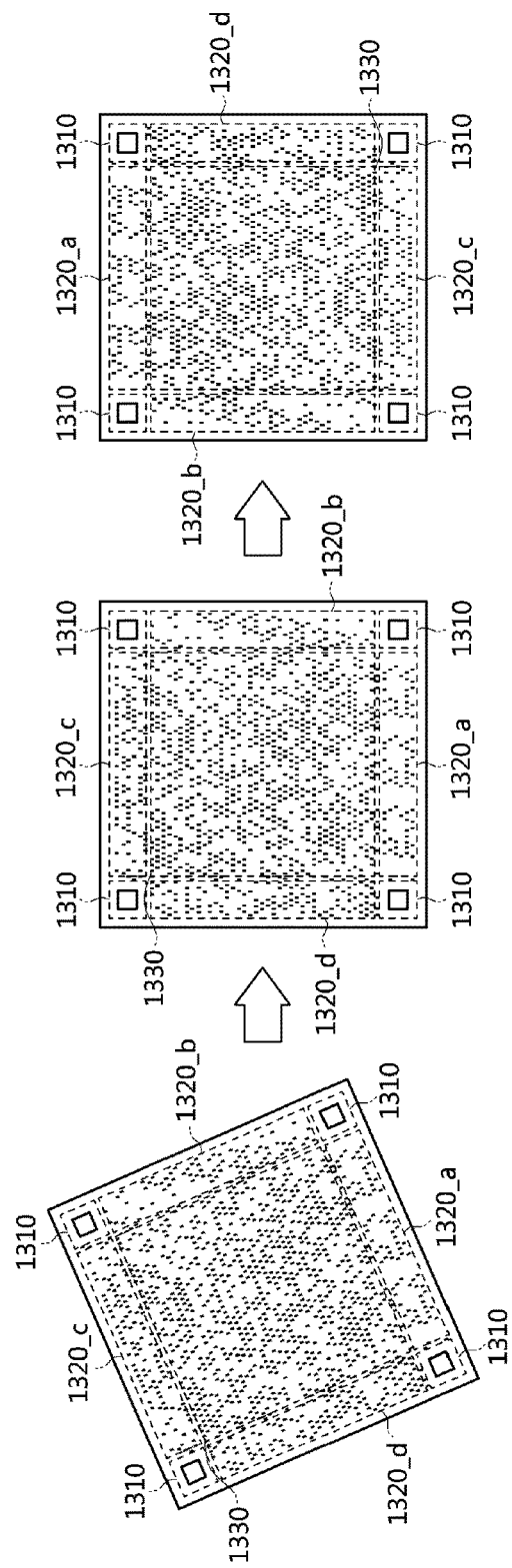
FIG. 13 is an exemplary diagram for explaining a distortion correction process according to an embodiment of the present invention.

FIG. 13 is an exemplary diagram for explaining a distortion correction process according to an embodiment of the present invention.

As shown in FIG. 13, the extracted 2D barcode may include geometric distortion. Therefore, the 2D barcode information extraction apparatus 600 according to an embodiment of the present invention may extract distortion correction patterns 1310 and may correct geometric distortion in the 2D barcode using the extracted distortion correction patterns 1310.

A square-shaped 2D barcode in which geometric distortion is corrected may have a shape in which an original 2D barcode is rotated at an angle of 0°, 90°, 180°, or 270°. For example, when the 2D barcode in which geometric distortion is corrected is rotated at an angle of 180°, the 2D barcode information extraction apparatus 600 may correct the direction of the 2D barcode into that of the original 2D barcode by rotating the geometric distortion-corrected 2D barcode at an angle of 180°.

In this case, the 2D barcode information extraction apparatus 600 calculates a correlation coefficient between a first metadata pattern 1320_a and a second metadata pattern 1320_b, a correlation coefficient between the first metadata pattern 1320_a and a fourth metadata pattern 1320_d, a correlation coefficient between the second metadata pattern 1320_b and a third metadata pattern 1320_c, and a correlation coefficient between the third metadata pattern 1320_c and the fourth metadata pattern 1320_d.

Further, the 2D barcode information extraction apparatus 600 corrects the direction of the 2D barcode based on the metadata having the highest correlation coefficient depending on the results of the calculation. For example, in FIG. 13, when the correlation coefficient between the first metadata pattern 1320_a and the second metadata pattern 1320_b is the highest, the 2D barcode information extraction apparatus 600 may correct the direction of the 2D barcode, as shown in FIG. 13.

Referring back to FIG. 12, the 2D barcode information extraction apparatus 600 extracts metadata and data blocks at step S1230.

The 2D barcode information extraction apparatus 600 extracts metadata from the geometric distortion-corrected 2D barcode and extracts data blocks using the extracted metadata.

The 2D barcode information extraction apparatus 600 may extract sets of symbols from the metadata patterns of the geometric distortion-corrected 2D barcode, and may extract sets of symbols from the data block patterns of the geometric distortion-corrected 2D barcode. Furthermore, the 2D barcode information extraction apparatus 600 may calculate correlations between the extracted symbols and pre-stored symbols.

The 2D barcode information extraction apparatus 600 determines insertion target information to be the value of a bitstream corresponding to a symbol having the highest correlation coefficient as a result of calculation of the correlations, and extracts metadata from a metadata bitstream. Further, the 2D barcode information extraction apparatus 600 extracts data, which is divided by the division unit, from the bitstream of the data blocks.

Although, for the convenience of description, the 2D barcode information extraction apparatus 600 has been described as extracting the metadata and the data blocks from the 2D barcode, this process may mean a procedure in which the 2D barcode information extraction apparatus 600 extracts the metadata and the data blocks by extracting metadata patterns and data block patterns from the 2D barcode and converting the extracted metadata patterns and the extracted data block patterns based on symbols.

Finally, the 2D barcode information extraction apparatus 600 may reconstruct insertion data at step S1240.

The 2D barcode information extraction apparatus 600 may reconstruct the insertion data from the data blocks based on the division unit of the insertion data contained in the metadata.

Figure 14:
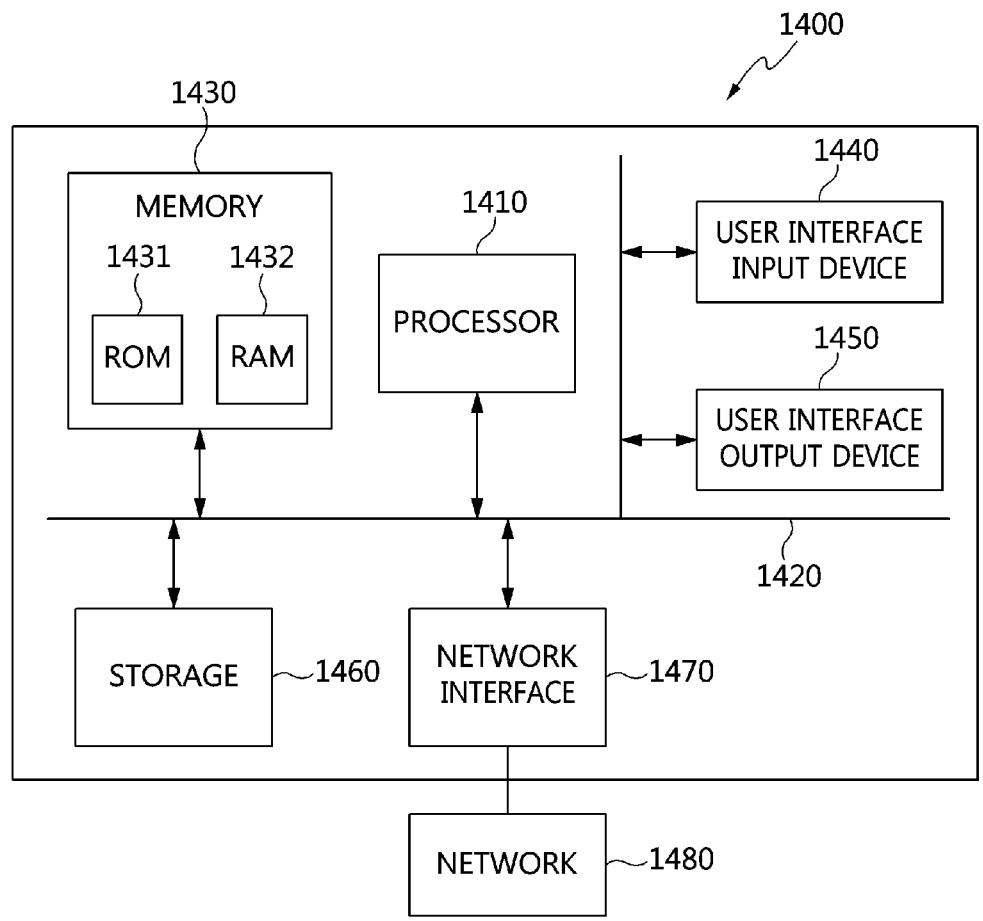
FIG. 14 is a block diagram for explaining a computer system according to an embodiment of the present invention.

FIG. 14 is a block diagram illustrating a computer system according to an embodiment of the present invention.

Referring to FIG. 14, the embodiment of the present invention may be implemented in a computer system 1400, such as a computer-readable storage medium. As shown in FIG. 14, the computer system 1400 may include processors 1410, memory 1430, a user interface input device 1440, a user interface output device 1450, and storage 1460, which communicate with each other through a bus 1420. The computer system 1400 may further include a network interface 1470 connected to a network 1480. Each of the processors 140 may be either a Central Processing Unit (CPU) or a semiconductor device for executing processing instructions stored in the memory 1430 or the storage 1460. Each of the memory 1430 and the storage 1460 may be any of various types of volatile or nonvolatile storage media. For example, the memory 1430 may include Read-Only Memory (ROM) 1431 or Random-Access Memory (RAM) 1432.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, it is possible to generate a 2D barcode that contains large-capacity data robust to geometric distortion.

Further, in accordance with the present invention, it is possible to extract large-capacity data, contained in a 2D barcode, from a 2D barcode image captured by an image capture device in which geometric distortion frequently occurs.

Furthermore, in accordance with the present invention, it is possible to generate a 2D barcode that contains large-capacity data, such as that of as an electronic document or an image file, and to extract large-capacity data from the generated 2D barcode.

As described above, in the 2D barcode generation apparatus and method and the 2D barcode information extraction apparatus according to the present invention, the configurations and schemes in the above-described embodiments are not limitedly applied, and some or all of the above embodiments can be selectively combined and configured so that various modifications are possible.

What is claimed is:

1. An apparatus for generating a two-dimensional (2D) barcode, comprising:
   a metadata creation unit for creating metadata corresponding to insertion data and a 2D barcode;
   a data conversion unit for generating data blocks by converting the insertion data based on the metadata;
   a pattern generation unit for generating metadata patterns and data block patterns by substituting respective predefined symbols for the metadata and the data blocks; and
   a 2D barcode generation unit for generating a 2D barcode that contains distortion correction patterns, the metadata patterns, and the data block patterns,
   wherein the metadata includes an entire length of the insertion data, a division unit of the insertion data, an error correction code corresponding to the division unit, an error correction code corresponding to the metadata, and a block size of the 2D barcode,
   wherein the data conversion unit generates the data blocks by dividing the insertion data by the division unit of the insertion data and by inserting an error correction code and an index, which correspond to the division unit, into each piece of insertion data resulting from the division,
   wherein the 2D barcode generation unit generates the 2D barcode by inserting a plurality of distortion correction patterns in a row direction and a column direction of the 2D barcode,
   wherein the 2D barcode generation unit generates the 2D barcode by inserting the metadata patterns into at least two of spaces between the distortion correction patterns, and
   wherein a direction of the 2D barcode is corrected based on correlation coefficients between the metadata patterns.

2. The apparatus of claim 1, wherein the 2D barcode generation unit generates the 2D barcode by inserting a plurality of distortion correction patterns at intervals of the block size of the 2D barcode in a row direction and a column direction of the 2D barcode.

3. The apparatus of claim 2, wherein the 2D barcode generation unit generates the 2D barcode by inserting the metadata patterns into at least two of an uppermost row, a lowermost row, a leftmost column, and a rightmost column of the 2D barcode.

4. The apparatus of claim 1, wherein the data block patterns are inserted into regions corresponding to the block size of the 2D barcode, excluding regions of the distortion correction patterns and the metadata patterns.

5. An apparatus for extracting two-dimensional (2D) barcode information, comprising:
   an image acquisition unit for receiving an image including a 2D barcode that contains distortion correction patterns, metadata patterns, and data block patterns;
   a 2D barcode extraction unit for extracting the 2D barcode from the image;
   a distortion correction unit for correcting geometric distortion in the metadata patterns and the data block patterns that are contained in the 2D barcode;
   an information extraction unit for extracting metadata and data blocks from a corrected 2D barcode; and
   a data reconstruction unit for reconstructing insertion data corresponding to the 2D barcode using the extracted metadata and the extracted data blocks,
   wherein the metadata includes an entire length of the insertion data, a division unit of the insertion data, an error correction code corresponding to the division unit, an error correction code corresponding to the metadata, and a block size of the 2D barcode,
   wherein the data blocks are generated by dividing the insertion data by the division unit of the insertion data and by inserting an error correction code and an index, which correspond to the division unit, into each piece of insertion data resulting from the division,
   wherein the 2D barcode is generated by inserting a plurality of distortion correction patterns in a row direction and a column direction of the 2D barcode,
   wherein the 2D barcode is generated by inserting the metadata patterns into at least two of spaces between the distortion correction patterns, and
   wherein the distortion correction unit corrects a direction of the 2D barcode by calculating correlation coefficients between the metadata patterns.

6. The apparatus of claim 5, wherein the 2D barcode extraction unit extracts the 2D barcode from the image using an outline hierarchy structure corresponding to the image.

7. The apparatus of claim 6, wherein the distortion correction unit extracts the distortion correction patterns contained in the 2D barcode and corrects geometric distortion in the 2D barcode using the extracted distortion correction patterns.

8. The apparatus of claim 7, wherein the distortion correction unit extracts the distortion correction patterns using a method corresponding to at least one of pattern matching and an outline hierarchy structure relationship.

9. The apparatus of claim 7, wherein the metadata patterns are inserted into at least two of an uppermost row, a lowermost row, a leftmost column, and a rightmost column of the 2D barcode.

10. The apparatus of claim 7, wherein the data reconstruction unit reconstructs the insertion data from the data blocks using a division unit of insertion data included in the metadata.

11. A method for generating a two-dimensional (2D) barcode, the method being performed by a 2D barcode generation apparatus, the method comprising:
    creating metadata corresponding to insertion data and a 2D barcode;
    generating data blocks by converting the insertion data based on the metadata;
    generating metadata patterns and data block patterns by substituting respective predefined symbols for the metadata and the data blocks; and
    generating a 2D barcode that contains distortion correction patterns, the metadata patterns, and the data block patterns,
    wherein the metadata includes an entire length of the insertion data, a division unit of the insertion data, an error correction code corresponding to the division unit, an error correction code corresponding to the metadata, and a block size of the 2D barcode,
    wherein the data blocks are generated by dividing the insertion data by the division unit of the insertion data and by inserting an error correction code and an index, which correspond to the division unit, into each piece of insertion data resulting from the division, wherein generating the 2D barcode comprises:

inserting a plurality of distortion correction patterns in a row direction and a column direction of the 2D barcode, and inserting the metadata patterns into at least two of spaces between the distortion correction patterns, and wherein a direction of the 2D barcode is corrected based on correlation coefficients between the metadata patterns.

12. The method of claim 11, wherein generating the 2D barcode comprises:

inserting a plurality of distortion correction patterns at intervals of the block size of the 2D barcode in a row direction and a column direction of the 2D barcode; and inserting the metadata patterns into at least two of an uppermost row, a lowermost row, a leftmost column, and a rightmost column of the 2D barcode.

13. The method of claim 12, wherein the data block patterns are inserted into regions corresponding to the block size of the 2D barcode, excluding regions of the distortion correction patterns and the metadata patterns.

14. The method of claim 11, wherein the generated 2D barcode is extracted by a 2D barcode information extraction apparatus from an image including the 2D barcode, geometric distortion in the 2D barcode is corrected using the distortion correction patterns, and the 2D barcode is reconstructed as the insertion data using the metadata and the data blocks that are extracted from the corrected 2D barcode.

* * * * *